(12) United States Patent
Shrivastava et al.

(10) Patent No.: US 6,449,734 B1
(45) Date of Patent: *Sep. 10, 2002

(54) METHOD AND SYSTEM FOR DISCARDING LOCALLY COMMITTED TRANSACTIONS TO ENSURE CONSISTENCY IN A SERVER CLUSTER

(75) Inventors: Sunita Shrivastava, Redmond; John D. Vert, Seattle, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,211

(22) Filed: Apr. 17, 1998

(51) Int. Cl.$^7$ .................................................. H02H 3/05

(52) U.S. Cl. ........................ 714/15; 714/4; 714/38; 714/51; 707/8; 709/219

(58) Field of Search .......................... 714/15, 4, 38, 714/51; 370/60; 707/10, 202, 203, 204, 511, 8; 709/219, 223, 24

(56) References Cited

U.S. PATENT DOCUMENTS 4,736,393 A 4/1988 Grimes et al.
5,021,949 A * 6/1991 Morten et al. ............... 709/231

(List continued on next page.)

OTHER PUBLICATIONS

Chen et al. "Designing Mobile Computing Systems Using Distributed Objects", *IEEE Communications Magazine*, vol. 35, No. 2, pp. 62–70 (Feb. 1997).

Chowdhury et al., "Supporting Dynamic Space–Sharing on Cluster of Non–dedicated Workstations", *International Conference on Distributed Computing Systems*, pp. 149–158 (1997).

Islam, et al. "Extensible Resource Management for Cluster Computing", *Distributed Computing Systems 1997, Proceedings of the 17$^{th}$ International Conference*, pp. 561–567 (May 1997).

Carr, Richard, "The Tandem Global Update Protocol," *Tandem Systems Review*, vol. 1, No. 2, 74–85 (1985).

Lamport, Leslie, *A Fast Mutual Exclusion Algorithm*, Digital Equipment Corporation, Oct. 31, 1986.

Lamport, Leslie, *The Part–Time parliament*, Digital Equipment Corporation, Sep. 1, 1989.

*Primary Examiner*—Ayaz Sheikh
*Assistant Examiner*—Firmin Backer
(74) *Attorney, Agent, or Firm*—Michalik & Wylie, PLLC

(57) ABSTRACT

A method and system for forming a new cluster of servers having state data that is consistent with the state data of a cluster that previously existed. The previous cluster preserves its state data by recording transactions to a log file in conjunction with a sequence number maintained by each node. The node that recorded the transaction then increments its copy of the sequence number and attempts to replicate the transaction to other nodes of the cluster. If the transaction is replicated, each other node commits the transaction and increments its sequence number. If the node fails before it can replicate the transaction, then no other nodes will increment their sequence numbers, whereby the next logged transaction has the same sequence number as the previously logged, but orphaned replicated transaction. When a new node forms a cluster, it unrolls the log file so as to become consistent with the state of the previous cluster. Logged transactions having duplicate sequence numbers indicate that the first such transaction was not fully replicated. To remain consistent, the first transaction is discarded and not used to update the state of the new cluster.

24 Claims, 12 Drawing Sheets

U.S. PATENT DOCUMENTS

| | | | | |
|---|---|---|---|---|
| 5,027,269 A | | 6/1991 | Grant et al. | |
| 5,117,352 A | | 5/1992 | Falek | |
| 5,128,885 A | | 7/1992 | Janis et al. | |
| 5,165,018 A | | 11/1992 | Simor | |
| 5,301,337 A | | 4/1994 | Wells et al. | |
| 5,341,372 A | | 8/1994 | Kirkham | |
| 5,398,329 A | | 3/1995 | Hirata et al. | |
| 5,416,777 A | | 5/1995 | Kirkham | |
| 5,423,037 A | | 6/1995 | Hvasshovd | |
| 5,434,865 A | | 7/1995 | Kirkham | |
| 5,435,003 A | | 7/1995 | Chng et al. | |
| 5,490,270 A | | 2/1996 | Devarakonda et al. | |
| 5,491,800 A | | 2/1996 | Goldsmith et al. | |
| 5,537,532 A | | 7/1996 | Chng et al. | |
| 5,568,491 A | | 10/1996 | Beal et al. | |
| 5,666,486 A | | 9/1997 | Alfieri et al. | |
| 5,666,538 A | | 9/1997 | DeNicola | |
| 5,710,727 A | | 1/1998 | Mitchell et al. | |
| 5,715,389 A | | 2/1998 | Komori et al. | |
| 5,737,601 A | | 4/1998 | Jain et al. | |
| 5,745,669 A | | 4/1998 | Hugard et al. | |
| 5,754,752 A | | 5/1998 | Sheh et al. | |
| 5,754,877 A | | 5/1998 | Hagersten et al. | |
| 5,757,642 A | * | 5/1998 | Jones | 364/134 |
| 5,768,523 A | | 6/1998 | Schmidt | |
| 5,768,524 A | | 6/1998 | Schmidt | |
| 5,781,737 A | | 7/1998 | Schmidt | |
| 5,787,247 A | * | 7/1998 | Norin et al. | 395/200.5 |
| 5,794,253 A | * | 8/1998 | Norin et al. | 707/203 |
| 5,805,839 A | | 9/1998 | Singhal | |
| 5,806,075 A | | 9/1998 | Jain et al. | |
| 5,812,779 A | | 9/1998 | Ciscon et al. | |
| 5,815,649 A | | 9/1998 | Utter et al. | |
| 5,819,019 A | | 10/1998 | Nelson | |
| 5,822,532 A | | 10/1998 | Ikeda | |
| 5,832,514 A | * | 11/1998 | Norin et al. | 707/202 |
| 5,852,724 A | | 12/1998 | Glenn, II et al. | |
| 5,857,073 A | | 1/1999 | Tsukamoto et al. | |
| 5,867,714 A | | 2/1999 | Todd et al. | |
| 5,919,247 A | | 7/1999 | Van Hoff et al. | |
| 5,933,422 A | | 8/1999 | Kusano et al. | |
| 5,935,230 A | | 8/1999 | Pinai et al. | |
| 5,940,870 A | * | 8/1999 | Chi et al. | 711/206 |
| 5,946,689 A | * | 8/1999 | Yanaka et al. | 707/10 |
| 5,963,960 A | * | 10/1999 | Swart et al. | 707/202 |
| 5,968,121 A | | 10/1999 | Logan et al. | |
| 5,968,140 A | | 10/1999 | Hall | |
| 5,982,747 A | | 11/1999 | Ramfelt et al. | |
| 5,991,771 A | | 11/1999 | Falls et al. | |
| 5,991,893 A | * | 11/1999 | Snider | 714/4 |
| 6,003,075 A | | 12/1999 | Arendt et al. | |
| 6,044,367 A | | 3/2000 | Wolff | |
| 6,047,323 A | | 4/2000 | Krause | |
| 6,134,673 A | | 10/2000 | Chrabaszcz | |
| 6,173,420 B1 | | 1/2001 | Sunkara et al. | |
| 6,195,760 B1 | | 2/2001 | Chung et al. | |

\* cited by examiner

METHOD AND SYSTEM FOR DISCARDING LOCALLY COMMITTED TRANSACTIONS TO ENSURE CONSISTENCY IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be quickly restarted on a surviving server, with no substantial reduction in service. Indeed, clients of a Windows NT cluster believe they are connecting with a physical system, but are actually connecting to a service which may be provided by one of several systems. To this end, clients create a TCP/IP session with a service in the cluster using a known IP address. This address appears to the cluster software as a resource in the same group (i.e., a collection of resources managed as a single unit) as the application providing the service. In the event of a failure the cluster service "moves" the entire group to another system.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

While clustering is thus desirable in many situations, problems arise if the servers (nodes) of the cluster become inconsistent with one another with respect to certain persistent cluster information. For example, memory state information, properties of the cluster or its resources and/or the state and existence of components in the cluster need to be consistent among the cluster's nodes. A global update protocol is used to ensure consistency of updates to this persistent state. Moreover, if a cluster shuts down and a new cluster is later formed with no members common to the previous cluster, a situation known as a temporal partition, a potential problem exists because no new member necessarily possesses the current state information of the previous cluster.

To maintain consistency across a temporal partition, a log file is maintained. Each time a modification to the cluster state information takes place, the change is recorded in the log file. Then, when a new node forms a cluster, it unrolls any changes recorded in the log file to make its local database consistent with the last state of the previous cluster before it went down.

However, different nodes can fail at different times. In one particular event, a node may fail just after it has committed a change locally and caused the change to be logged in the log file, but before any other node can find out about the change. As soon as another state change occurs and is logged by a surviving node, the previous entry in the log file is not consistent with the state of the surviving cluster. If a new cluster is later formed following a temporal partition, the node forming the cluster will unroll this inconsistent information from the log file, whereby the new cluster will be inconsistent with the previous (earlier-in-time) cluster.

SUMMARY OF THE INVENTION

The present invention provides a method and system for discarding change information in a server cluster that is locally committed and logged, but not replicated to other nodes. Such change information is preferably maintained and replicated as a transaction. If a transaction is not fully replicated due to a server failure or the like, and a subsequent transaction is logged, the previous transaction (referred to herein as an orphaned replicated transaction) is inconsistent with the actual state of a surviving cluster. When unrolling a log file to make a new cluster consistent with a previous cluster across a partition in time, such orphaned (logged, but not fully replicated) transactions are discarded by the present invention, whereby the new cluster becomes consistent with the actual state of the previous cluster.

Briefly, the present invention provides a method and system for recording the state data of a previous cluster and forming a new cluster of servers using that state data such that the new cluster is consistent with the state of the previous cluster. Each transaction is recorded in a log file with an associated sequence number. A local copy of the sequence number is monotonically adjusted (e.g., incremented) by each node each time that a transaction is replicated thereto. If a transaction is logged but not replicated, the next logged transaction will have the same sequence number, since no other node received the transaction and thus did not increment its sequence number. A node forming a new cluster, such as after a temporal partition, retrieves each transaction from the log file along with its associated sequence number. While unrolling the log file, the first of any logged transactions having duplicate sequence numbers are known to have been orphaned replicated transactions. Such orphaned replicated transactions are discarded rather than used to update the state of the node forming the new cluster, whereby the new cluster becomes consistent with the actual state of the previous cluster.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
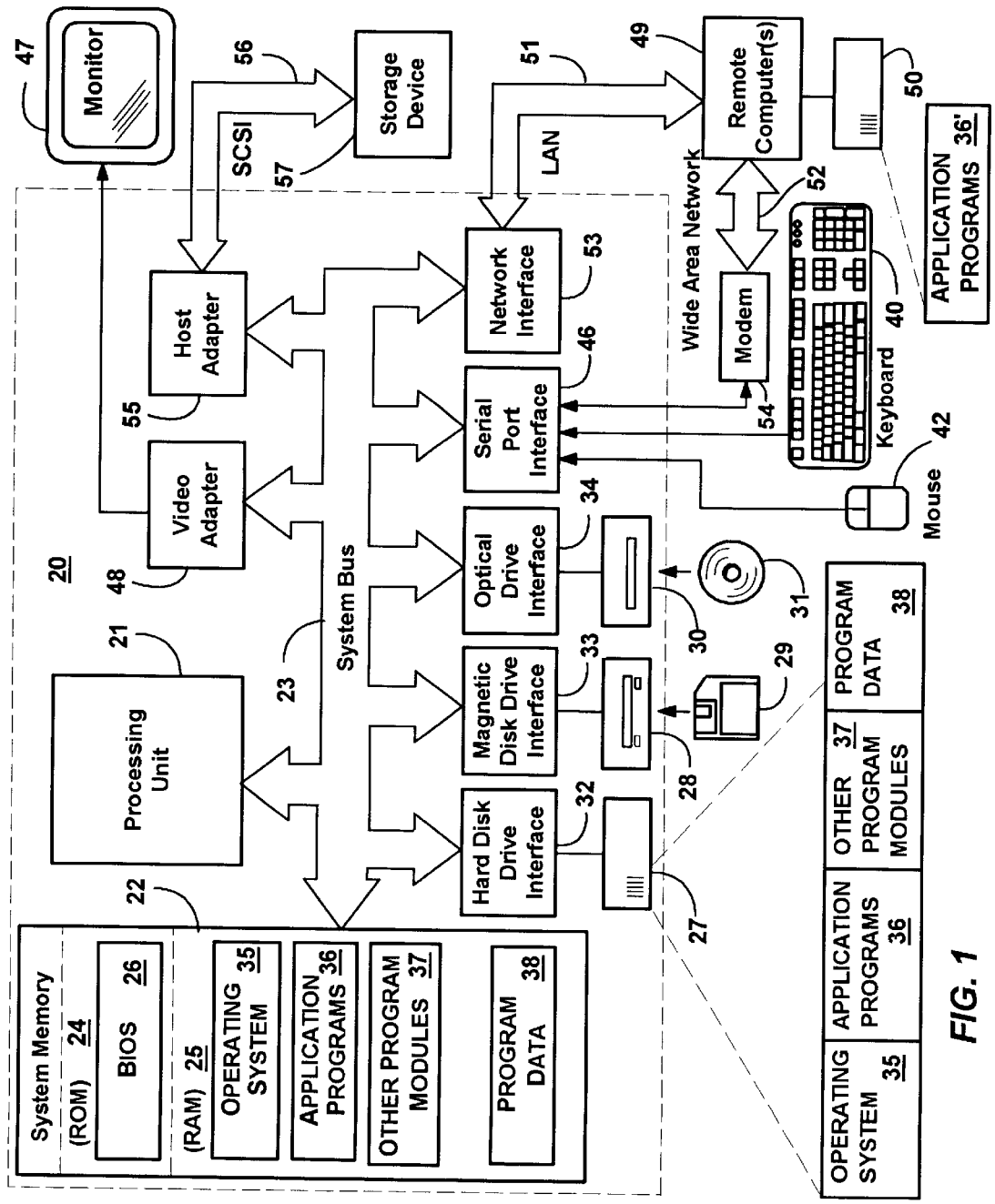
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2A:
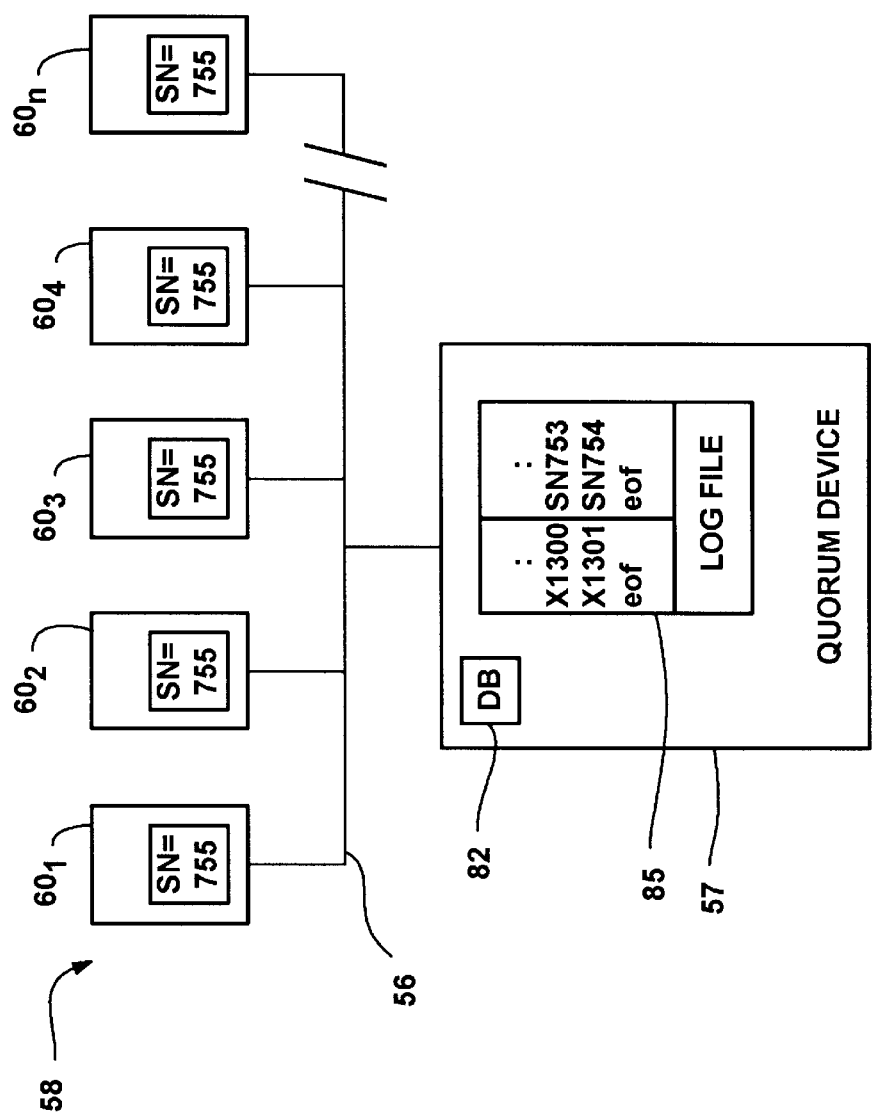
FIGS. 2A–2C are block diagrams representing a server cluster and a log file over a period of time.

The preferred system 20 further includes a host adapter 55 or the like which connects the system bus 23 to a SCSI (Small Computer Standard Interface) bus 56 for communicating with at least one persistent memory storage device 57, also referred to herein as a quorum device. Of course, other ways of connecting cluster systems to a storage device, including Fibre Channel, are equivalent. In any event, as shown in FIG. 2A, the computer system 20 may comprise the system $60_1$, while one of the remote computers 49 may be similarly connected to the SCSI bus 56 and comprise the system $60_2$, and so on. Note that multiple shared storage devices may be connected to the SCSI bus 56 (or the like) such as for purposes of resilience to disk failure through the use of multiple disks, i.e., software and/or hardware-based redundant arrays of inexpensive or independent disks (RAID).

To create a new cluster, a system administrator runs a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

Figure 3:
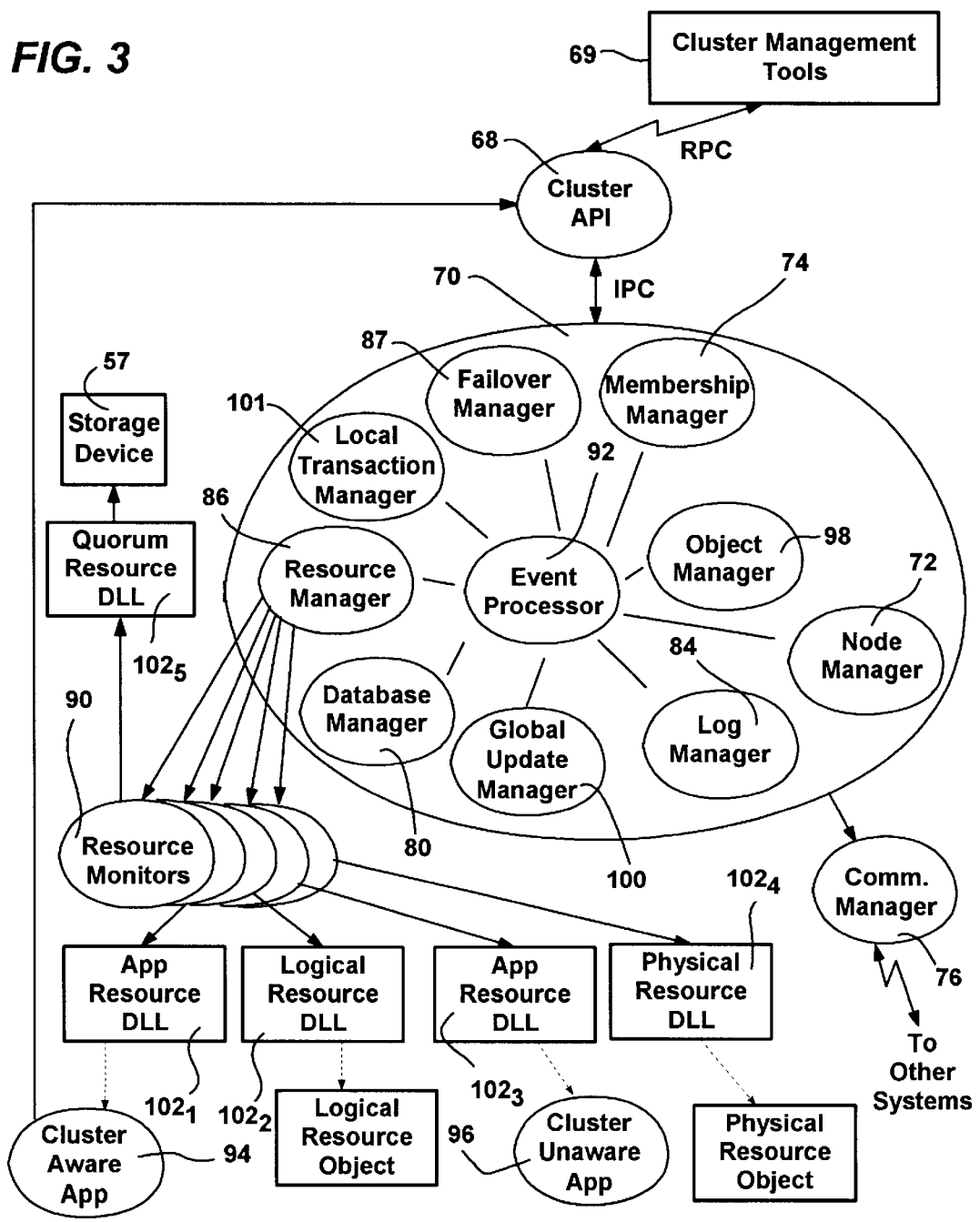
FIG. 3 is a representation of various components within the clustering service of a node.

As shown in FIG. 3, to accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself.

Cluster Service Components

FIG. 3 provides a representation of the cluster service components and their general relationships in a single system (e.g., $60_1$) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is essentially in constant communication with the other systems of the cluster. In a small cluster, communication is fully connected, i.e., all systems of the cluster 58 are in direct communication with all other systems.

Systems (e.g., $60_1$–$60_n$ of FIG. 2A) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database Manager 80 which implements the functions that maintain a cluster configuration database on a local device such as a disk and/or memory, and a configuration database 82 (FIG. 2A) on the common persistent storage devices, (e.g., storage device 57). The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. As described in more detail below, global updates are used to ensure the consistency of the cluster database in each of systems. The configuration database manager 80 also provides an interface to the configuration database 82 for use by the other cluster service 70 components.

A logging manager 84 provides a facility that works with the database manager 80 to maintain cluster state information across a temporal partition. The logging manager 84 operates with a log file 85, preferably maintained on the quorum device (storage device 57), to unroll logged transactions, while discarding inconsistently logged transactions, in accordance with one aspect of the present invention and as described in more detail below.

A resource monitor 90 and failover manager 87 make resource/group management decisions and initiate appropriate actions, such as startup, restart and failover. The failover manager 87 is responsible for stopping and starting the system's resources, managing resource dependencies, and for initiating failover of groups. A group is a collection of resources organized to allow an administrator to combine resources into larger logical units and manage them as a unit of failover. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Group operations performed on a group affect all resources contained within that group. Dependency trees are described in more detail in U.S. Pat. application Ser. No. 08/963,049 entitled "Method and System for Resource Monitoring of Disparate Resources in a Server Cluster," assigned to the same assignee as the present invention.

The resource manager 86 and failover manager 87 components receive resource and system state information from at least one resource monitor 90 and the node manager 72, for example, to make decisions about groups. The failover manager 87 is responsible for deciding which systems in the cluster should "own" which groups. Those systems that own individual groups turn control of the resources within the group over to their respective resource managers 86.

An event notification mechanism ties together components of the cluster service 70 by dispatching events across them. The event processor 92 propagates events to applications (e.g., 94 and 96) and to and from the components within the cluster service 70, and also performs miscellaneous services such as delivering signal events to cluster-aware applications 94. The event processor 92, in conjunction with an object manager 98, also maintains various cluster objects. A global update manager 100 operates to provide a global update service that is used by other components within the Cluster Service 70.

The global update protocol (GLUP) is used by the global update manager 100 to broadcast updates to each node in a cluster. GLUP generally comprises a standard global update message format, state information maintained in each node, and a set of rules that specify how global update should be processed and what steps should be taken when failures occur.

In general, according to the GLUP protocol, one node (e.g. $60_1$) serves as a "locker" node. The locker node $60_1$ ensures that only one global update is in progress at any given time. A unique number typically identifies each node in the cluster, and thus a simple way to select the locker node $60_1$ is to choose the node having the lowest number as the locker node, e.g., the node that initially forms the cluster. If the locker node $60_1$ ever fails, then the node having the next lowest GLUP number (e.g., the first other node $60_2$ that joined the cluster) assumes responsibility as the locker node.

With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the system. In accordance with GLUP, the sender node sends the updates, one at a time, to the other nodes in a predetermined GLUP order that is ordinarily based on the unique number assigned to each node.

GLUP handles node failures without compromising consistency. If the sender node $60_2$ fails while an update is in progress, the locker node $60_1$ recognizes the failure and re-sends the update to the other nodes (e.g. $60_3$) in the system. The update is uniquely tagged so that nodes which have already received the update simply ignore the re-sent update. Alternatively, if the locker node $60_1$ fails, a new locker node (the node $60_2$) is chosen in GLUP succession order. Because the locker node $60_1$ may have failed while an update was in progress, the new locker node $60_2$ reconstructs and re-sends the last update it received, whereby other nodes accept and process or ignore the update depending on whether they previously received it. Lastly, if another node (e.g., $60_3$) fails to properly acknowledge an update, GLUP removes the failing node from the cluster since that node is inconsistent with the other nodes in the cluster.

A more detailed discussion of the GLUP protocol is described in the publication "Tandem Systems Review" Volume 1, Number 2, June, 1985 pp. 74–84.

Persistent multiple updates to a local node are treated as a single transaction that is replicated via GLUP across the nodes of a cluster. This ensures that multiple updates are replicated in an atomic, consistent, isolated and durable manner. By way of example, as a result of a modification to a set of resources, a local machine may wish to perform three sub-operations, e.g., update a registry, update data on a disk and update the state of the resource. These updates are handled as a single transaction by combining them into a single global update message, whereby via GLUP, all of these sub-operations are committed together on every node in the cluster else none one of the sub-operations are committed. Transactions committed across the resource manager 86 are performed by a local transaction manager 101, described in more detail below.

As described above, multiple modification updates are treated as a transaction, whereby either all such related modifications are committed together or none are committed. To this end, if a transaction is committed by a node, the other nodes in the system either commit the transaction or are excluded from the node. This ensures consistency, as either a node is consistent or has to leave the cluster and rejoin. As described below, rejoining a cluster includes receiving an updated copy of the cluster database (if the joining node's database is inconsistent), resulting in the rejoining node becoming consistent.

To prevent multiple nodes from simultaneously modifying a set of resources or group, a "master" node is provided to serialize the transaction. Only the master node initiates the replication of a transaction at the locker node and acts as the sender node to replicate the transaction. Thus, a "requester" node that wishes to replicate modifications made to some set of resources can only do so by first forwarding the requested transaction to the master node. Preferably, the master node is the node that owns a resource or group (as described above) on which the transaction is being requested. Of course, other mechanisms for determining which node will be a master for a given transaction are feasible. In any event, the use of a single master node for each resource or group prevents two nodes from simultaneously modifying the state of a resource or set of resources. The single master thus ensures isolated operation.

Figure 4:
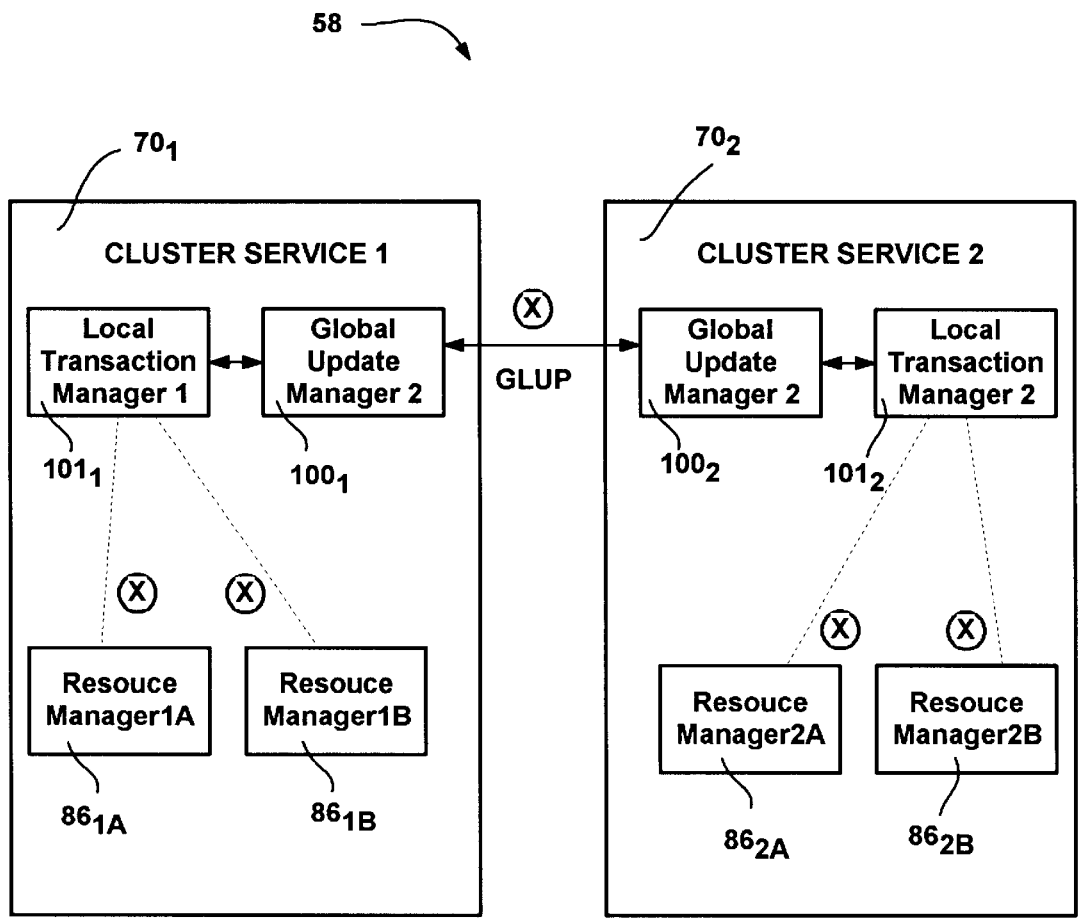
FIG. 4 is a representation of the components in two nodes for locally committing transactions.

The execution of the transaction on each node in the cluster is a local transaction. Therefore the coordinator of the transaction request is known as a Local Transaction Manager 101, as shown in FIGS. 3 and 4. The Local Transaction Manager1 ($101_1$) to Local Transaction Manager2 ($101_2$) communication is via the GLUP protocol. For example, if the Local Transaction Manager1 is in the master node, i.e., the Local Transaction Manager1 is the master of a transaction X (FIG. 4), then the transaction X is started by Local Transaction Manager1 coordinating with Local Transaction Manager2 via GLUP. Next, Local Transaction Manager1 performs the transaction X locally by coordinating the operation across the Resource Manager1A ($86_{1A}$) and Resource Manager1B ($86_{1B}$). Note that if only one resource manager is present in a node, a one-phase commit may be used, while a two-phase commit is used for more than one resource manager.

After performing the transaction, the transaction request is forwarded to Local Transaction Manager2 via GLUP. The Local Transaction Manager2 next performs the transaction X across Resource Manager2A and Resource Manager2B. When Local Transaction Manager2 returns its status to Local Transaction Manager1, Local Transaction Manager1 then informs the locker node that the replicated operation is complete. If the status returned by Local Transaction Manager2 indicates a failure to perform the transaction, then GLUP is responsible for ensuring that the system running the Local Transaction Manager2 is removed from the cluster, since it is no longer consistent with the master node.

Note that if the Local Transaction Manager1 on the master node cannot perform the requested transaction X, then the originating request is failed immediately and appropriate status is returned to the requester node. In this case, the transaction request is terminated immediately and no other node in the cluster is informed of the request, whereby the cluster remains consistent.

Figure 5:
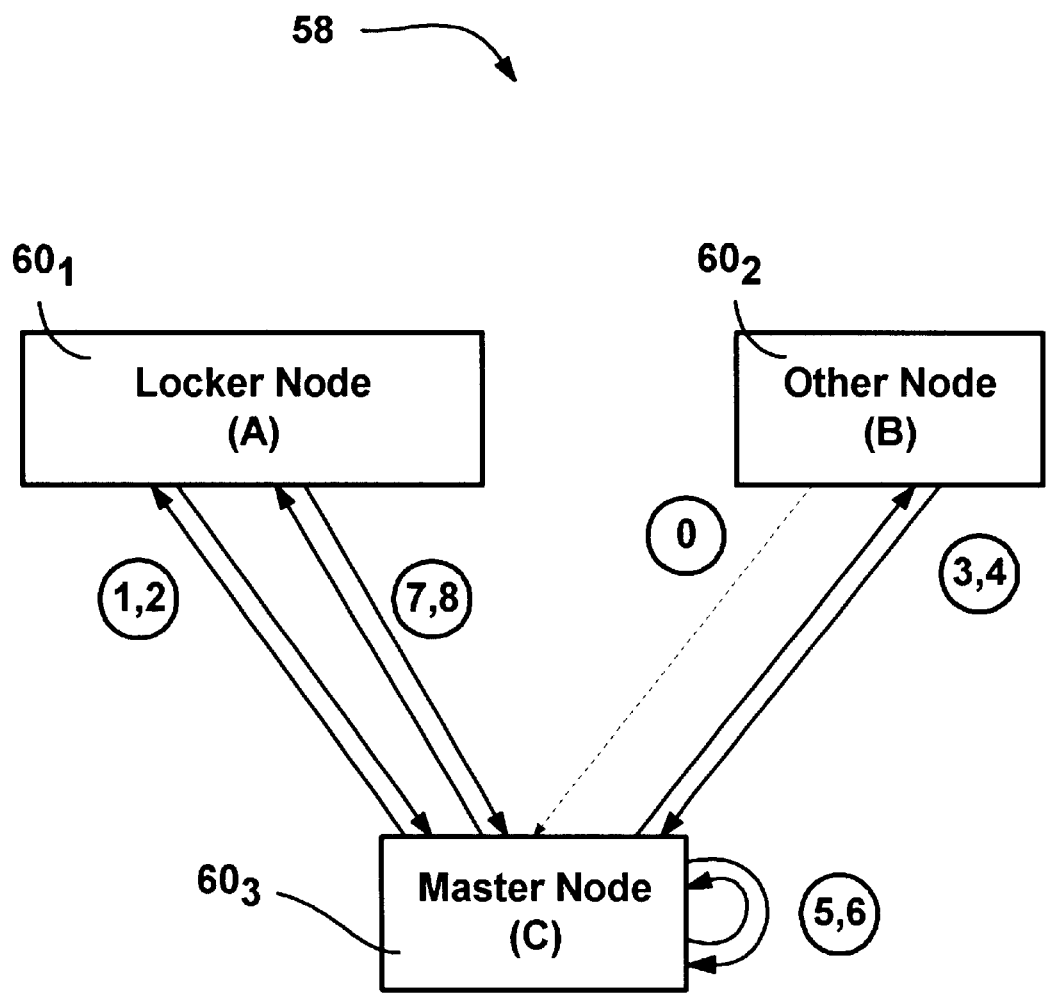
FIG. 5 is a block diagram representing a three-node cluster wherein a transaction is replicated to the nodes.

FIG. 5 represents a three-node cluster in which a transaction is to be replicated. In the following example, in FIG. 5, the node $60_2$ is the requestor node that desires to replicate a transaction on a set of resources owned by the node $60_3$. Thus, the node $60_3$ becomes the master node for this transaction. Also, the node $60_1$ is the locker node. As can be appreciated, for a given transaction, any node or nodes may operate as the master or requester node, e.g., the locker node may also be the requestor node and/or master node for a given transaction.

Figure 6:
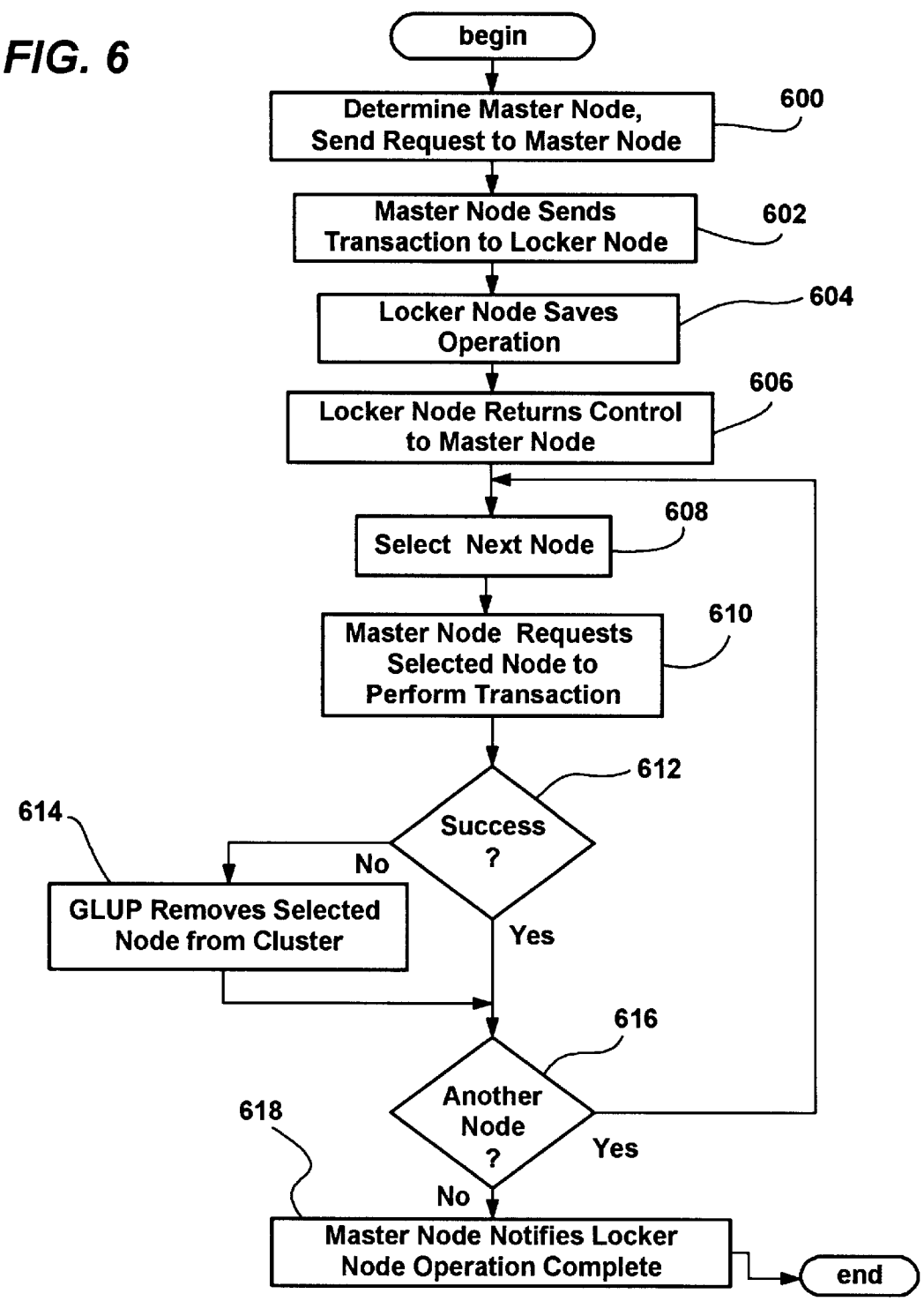
FIG. 6 is a flow diagram generally representing the steps taken to replicate a transaction to nodes of a multiple node cluster.

FIG. 6 is a flow diagram representing the general steps taken in replicating a transaction under typical circumstances. First, at step 600, the requestor node $60_2$ determines which node is the master node, which in the present example is the node $60_3$. Note that as described above, each node knows which nodes own which resources and groups. As also shown in step 600, after the master node is determined to be the node $60_3$, the requester node $60_2$ forwards the transaction request to the master node $60_3$. In FIG. 5, this is represented by the dashed line labeled "0," wherein a dashed line is used to represent this operation because any of the three nodes may originate such a transaction request. Next, at step 602, the master node 60₃ forwards the transaction request to the GLUP locker node 60₁, (represented in FIG. 5 as the line corresponding to the "1" in the "1,2" pair of lines). The locker node 60₁ queues this operation for replicating to other nodes after any previously-received updates have been broadcast. As can be readily appreciated, in this manner the locker node 60₁ thus ensures that only one global update is in progress at any one time.

Some time later when it is this transaction's turn for replication, steps 604–606 are executed, whereby the locker node 60₁ commits the transaction and saves the transaction data in GLUP storage, and permission to replicate is granted as control is returned to the master node 60₃ for replicating the transaction to the other nodes. This operation is additionally represented in FIG. 5 as the line corresponding to "2."

At step 608, the master node 60₃ selects a node for replicating the transaction thereto. In accordance with GLUP, the node is the node 60₂, selected in GLUP order (not including the locker node 60₁ which has already committed the transaction locally). Then at step 610, (and as additionally represented by "3" in FIG. 5), the master node requests the selected node 60₂ to commit the transaction. As described above, this is accomplished as the master node 60₃ makes the request via GLUP to the local transaction manager of the selected node 60₂. If the request is successfully processed, e.g., as represented by the "4" in FIG. 5 and the evaluation at step 612, the master node 60₃ selects the next node for committing the transaction by repeating steps 608–612. Conversely, if the request fails, at step 614, GLUP removes the node 60₃ from the cluster 58 to ensure consistency. In any event, in the present example, the master node selects itself next at step 608, as additionally represented by the "5,6" pair in FIG. 5.

Note that alternatively, the master node may first commit the transaction itself (and/or to the locker node) before replicating the transaction to any other node. In other words, rather than strictly following GLUP order, the master node may first commit the transaction itself and then later skip itself when the master node comes up in GLUP order.

Lastly, when the transaction has been replicated to all (remaining) nodes in the cluster, (step 616), at step 618 the master node 60₃ sends a message to the locker node 60₁ to inform the locker node 60₁ that the operation is complete ("7,8" of FIG. 5). At this time, all nodes have either committed the transaction or have been removed from the cluster.

Figure 7:
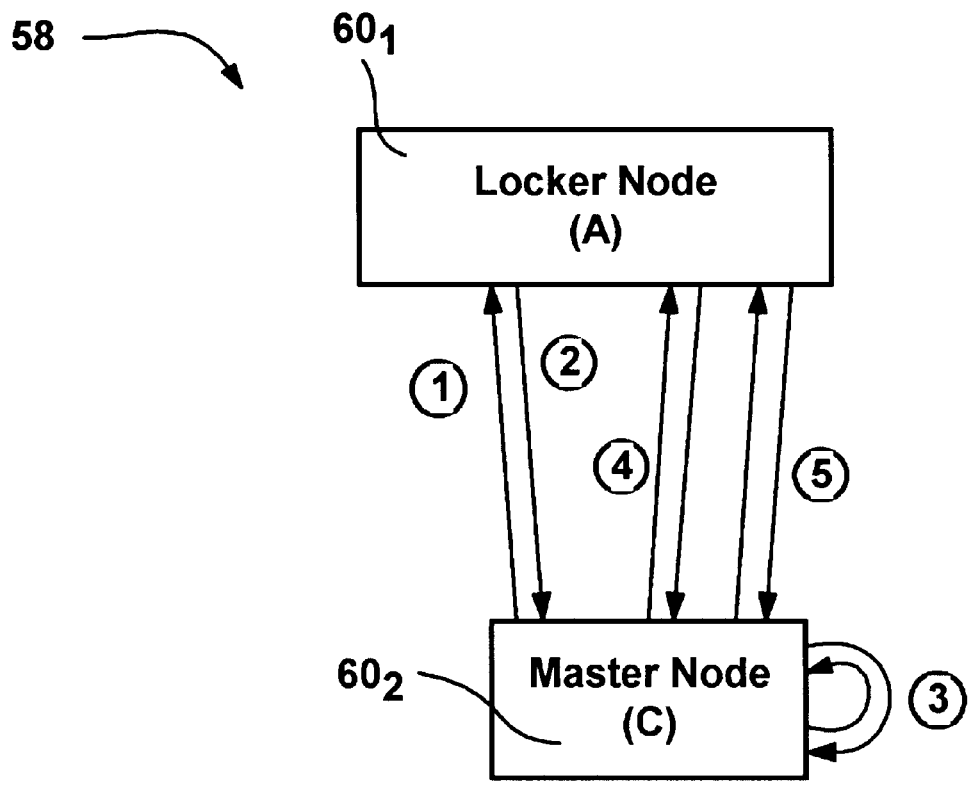
FIG. 7 is a block diagram representing the flow of control in a two-node cluster wherein a transaction is replicated to the nodes.
Figure 8:
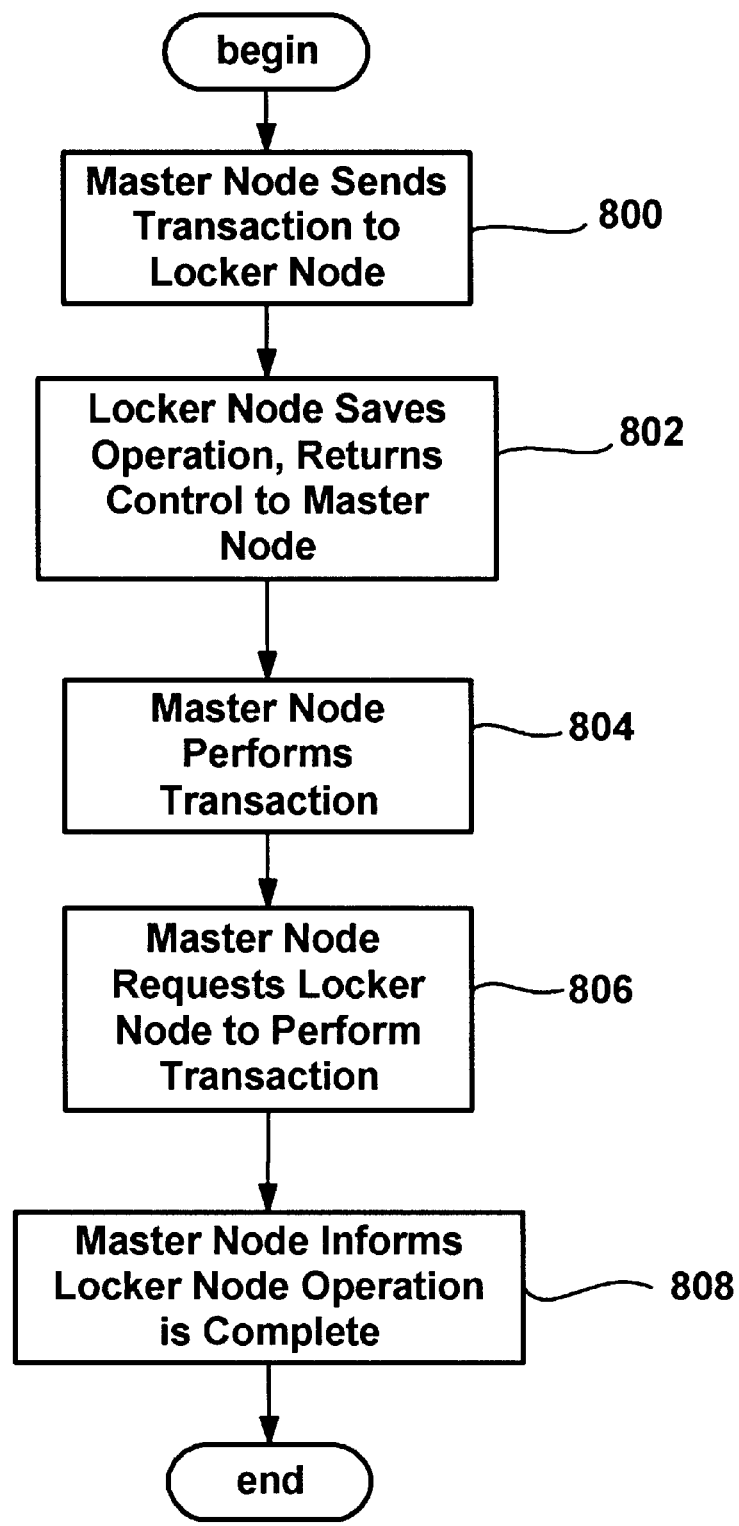
FIG. 8 is a flow diagram generally representing the steps taken to replicate a transaction in a two-node cluster.

FIG. 7 shows the flow of control in the two-node cluster, wherein the locker node 60₁ and master node 60₂ are separate systems, while FIG. 8 is a flow diagram describing the steps taken to replicate a transaction. At step 800 of FIG. 8, the master node 60₂ sends the transaction request to the GLUP locker node 60₁ to request the replicated operation. Then, at step 802, when the locker node 60₁ can begin the replicated operation, it performs the transaction and saves the requested operation, and returns control to the master node 60₂. At step 804, the master node 60₂ performs the transaction. Lastly, at step 808, the master node 60₂ informs the locker node 60₁ that the operation is complete.

If a failure occurs, the transaction is either performed atomically and consistently on the remaining node of the cluster, or it is not performed on any node in the cluster (which is still atomic and consistent). More particularly, if a failure occurs on the master node 60₂ at step 800, then no node in the cluster knows about the transaction and the cluster is still consistent. The transaction is failed, and if the requestor node was the locker node 60₁, a failed status is returned to the requester node. Alternatively, if a failure occurred on the locker node 60₁ at step 800, then in accordance with GLUP, the other node in cluster (which is the master node 60₂) takes over the locker responsibility and either completes the transaction itself, or if already complete, does nothing. The sole surviving node represents the cluster and, of course, is consistent.

If a failure occurs on the master node 60₂ at step 802, then if the master node 60₂ has begun the replicated operation, the locker node 60₁ simply completes the transaction by requesting itself to perform the transaction. Note that in the event that the replicated operation was not started, no node knows about the transaction, so the cluster (consisting solely of the locker node 60₁) is still consistent. Alternatively, if a failure occurs on the locker node 60₁, it is the same as a failure during step 800, i.e., the master node 60₂ is the sole surviving node, assumes the locker responsibility, and commits the transaction.

If a failure occurs on the master node 60₂ at steps 804, 806 or 808, the locker node 60₁ knows about the transaction and ensures that the transaction is applied on the one surviving node in the cluster, i.e., itself. Similarly, if a failure occurs on the locker node 60₁ at steps 804, 806 or 808, then the master node 60₂ assumes responsibility as the locker node and either performs the transaction, if not already done, or dismisses the transaction as completed.

As can be appreciated, the state of the cluster remains consistent and the operation is either performed everywhere or nowhere. The consistent replication of transactions are described in the co-pending U.S. patent application Ser. No. 09/062,359 entitled "Method and System for Replicated and Consistent Modifications in a Server Cluster" assigned to the assignee of the present invention, filed concurrently herewith and hereby incorporated by reference herein in its entirety.

A resource monitor 90 runs in one or more processes that may be part of the cluster service 70, but are shown herein as being separate from the cluster service 70 and communicating therewith via Remote Procedure Calls (RPC) or the like. The resource monitor 90 monitors the health of one or more resources (e.g., 102₁–102₅) via callbacks thereto. The monitoring and general operation of resources is described in more detail in U.S. patent application Ser. No. 08/963, 049, hereby incorporated by reference herein in its entirety.

The resources (e.g., 102₁–102₅) are implemented as one or more Dynamically Linked Libraries (DLLs) loaded into the address space of the Resource Monitor 102. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources 102₁–102₅ run in the system account and are considered privileged code. Resources 102₁–102₅ may be defined to run in separate processes, created by the Cluster Service 70 when creating resources.

Resources expose interfaces and properties to the cluster service 70, and may depend on other resources, with no circular dependencies allowed. If a resource does depend on other resources, the resource is brought online after the resources on which it depends are already online, and is taken offline before those resources. Moreover, each resource has an associated list of systems in the cluster on which this resource may execute. For example, a disk resource may only be hosted on systems that are physically connected to the disk. Also associated with each resource is a local restart policy, defining the desired action in the event that the resource cannot continue on the current system.

Systems in the cluster need to maintain a consistent view of time. One of the systems, known as the time source and selected by the administrator, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The event processor calls the node manager 72 to begin the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the database in the arriving node is examined, and if it is out of date, it is sent an updated copy. The joining system uses this shared database to find shared resources and to bring them online as needed, and also to find other cluster members.

If a cluster is not found during the discovery process, a system will attempt to form its own cluster. In general, to form a cluster, the system gains exclusive access to a special resource known as the quorum resource (quorum device) 57. The quorum resource 57 is used as a tie-breaker when booting a cluster and also to protect against more than one node forming its own cluster if communication fails in a multiple node cluster. The quorum resource is often (but not necessarily) a disk that maintains the state of the cluster, which a node arbitrates for and needs possession of before it can form a cluster. As shown in FIGS. 2A–2C and FIG. 9, the quorum resource 57 preferably maintains the log file 85 that is unrolled to ensure consistency across a temporal partition when forming a new cluster, after another cluster previously existed. The node 57 that has possession of the quorum resource is responsible for logging transactions to the log file 85 when requested by a node of the resource that commits a replicated transaction. Also, the quorum resource 57 offers a method for arbitrating a quorum resource object, typically by challenging (or defending) for an exclusive reservation of a storage device (e.g., 57 of FIG. 2A) such as a disk that ordinarily stores log data for the cluster. A method for releasing an exclusive reservation may also be provided. The general operation of quorum resources including arbitration and exclusive possession of the quorum resource is described in more detail in U.S. patent application Ser. No. 08/963,050 entitled "Method and System for Quorum Resource Arbitration in a Server Cluster," assigned to the same assignee and hereby incorporated by reference herein in its entirety.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster. Groups can be failed over or moved from one system to another as atomic units. Each group has a cluster-wide policy associated therewith comprising an ordered list of owners. A group fails over to systems in the listed order.

For example, if a resource fails, the resource monitor 90 may choose to restart the resource, or to take the resource offline along with any resources dependent thereon. If the resource monitor 90 takes the resource offline, the resource monitor 90 indicates to the failover manager 87 that the group should be restarted on another system in the cluster, known as pushing the group to another system. A cluster administrator may also manually initiate such a group transfer. Both situations are similar, except that resources are gracefully shutdown for a manually initiated failover, while they are forcefully shut down in the failure case.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 87 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when the failback occurs.

Discarding Locally Committed Transactions

Each time a transaction is replicated, the transaction is logged in the log file 85. As described above, this enables a node forming a cluster to unroll the log file 85 to recreate the precise state of the previous cluster following a temporal partition. To this end, as shown FIG. 9, the logging manager 84 executes an unrolling process 110 to sequentially read the transactions in the log file 85 and update the node's local database based on the transaction information recorded in the log file 85.

However, as also described above, it is possible for a node to commit a transaction locally, and log (or place a request to log) the transaction, but fail before the transaction can be communicated to another node. The transaction will be logged, however, since no other node knows about the transaction, no other node can take over and replicate the transaction. For example, the locker node is typically the node that initially formed the cluster, has exclusive possession of the quorum resource, and is thus responsible for logging transactions to the log file 85. Thus, the locker node may wish to replicate a transaction, whereby it will commit the transaction locally and then log the transaction. Before the locker node can replicate the transaction to another node, the locker node may fail. Although another node will take over locker responsibility, it will not know about the logged, but not fully replicated (orphaned) transaction.

As can be appreciated, logging an orphaned replicated transaction may result in an inconsistency. For example, the transaction at the locker node may include the operation of deleting some object, such as an object O. If the transaction is logged, then the object O will otherwise be deleted when the log file 85 is later unrolled. However, since this transaction is not known to any other node, another node may later log a transaction that changes some state in the object O, and indeed, numerous other operations modifying the object O's state may later take place. When unrolling the log file 85 and reading the later transaction or transactions, the object O will not exist, making any later modification thereto inconsistent, causing a potentially significant problem.

In accordance with one aspect of the present invention, to ensure consistency in the log file 85, whenever a transaction is logged in the log file 85, a monotonically increasing sequence number is maintained therewith. For example, the transaction may be maintained in the log file 85 as a record having a plurality of fields, with one field reserved for storing the sequence number. The sequence number is maintained in the locker node, and a copy given to each node when the node joins the cluster.

When a node locally commits a transaction and causes the transaction to be logged in the log file 85, its current sequence number will be stored with the transaction information, and the sequence number monotonically adjusted (e.g., incremented or decremented). Each time a transaction is successfully replicated to a node of a cluster, that node monotonically adjusts its copy of the number. Thus, the sequence number is the same in all surviving nodes following a successful replication. However, if that node fails and the transaction is not replicated to any other node, then the sequence number will remain at its current value in the other nodes. As a result, the next time a transaction is logged by a surviving node, the transaction will have the same sequence number as the previous, orphaned transaction.

Figure 2B:
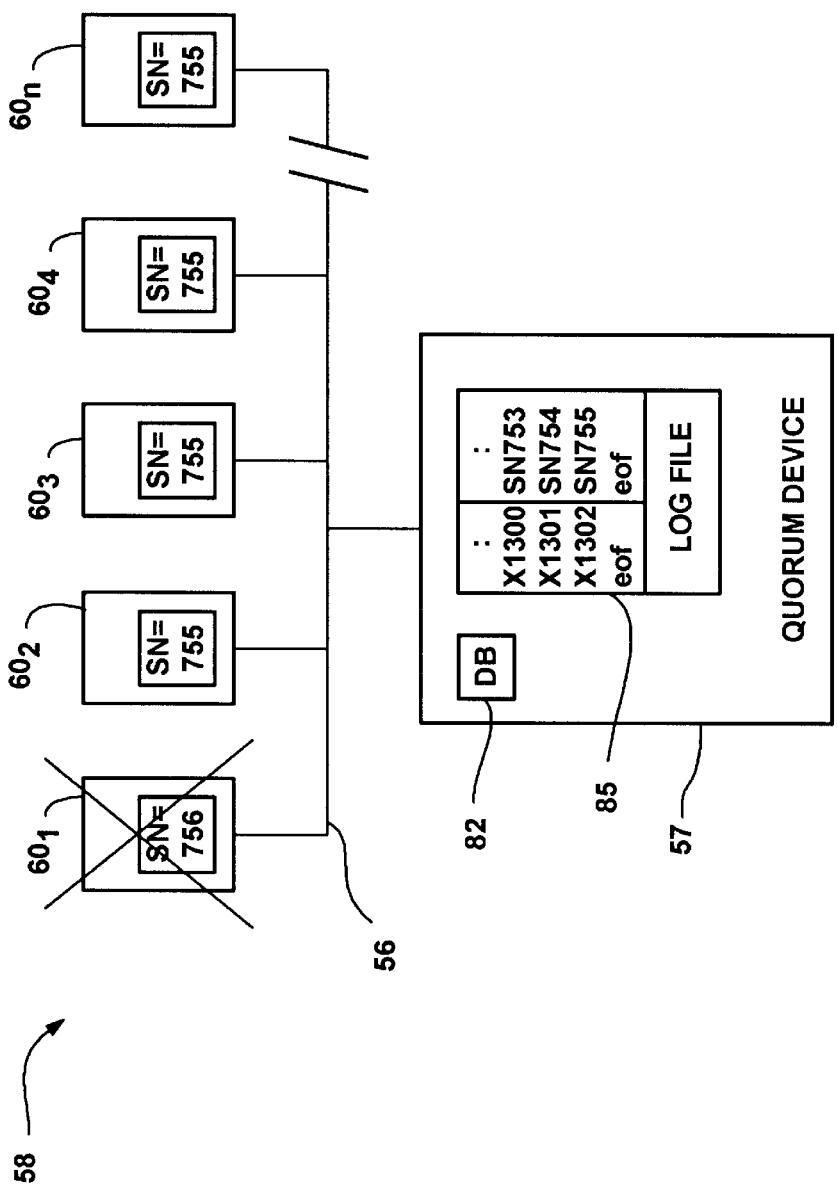
Figure 2C:
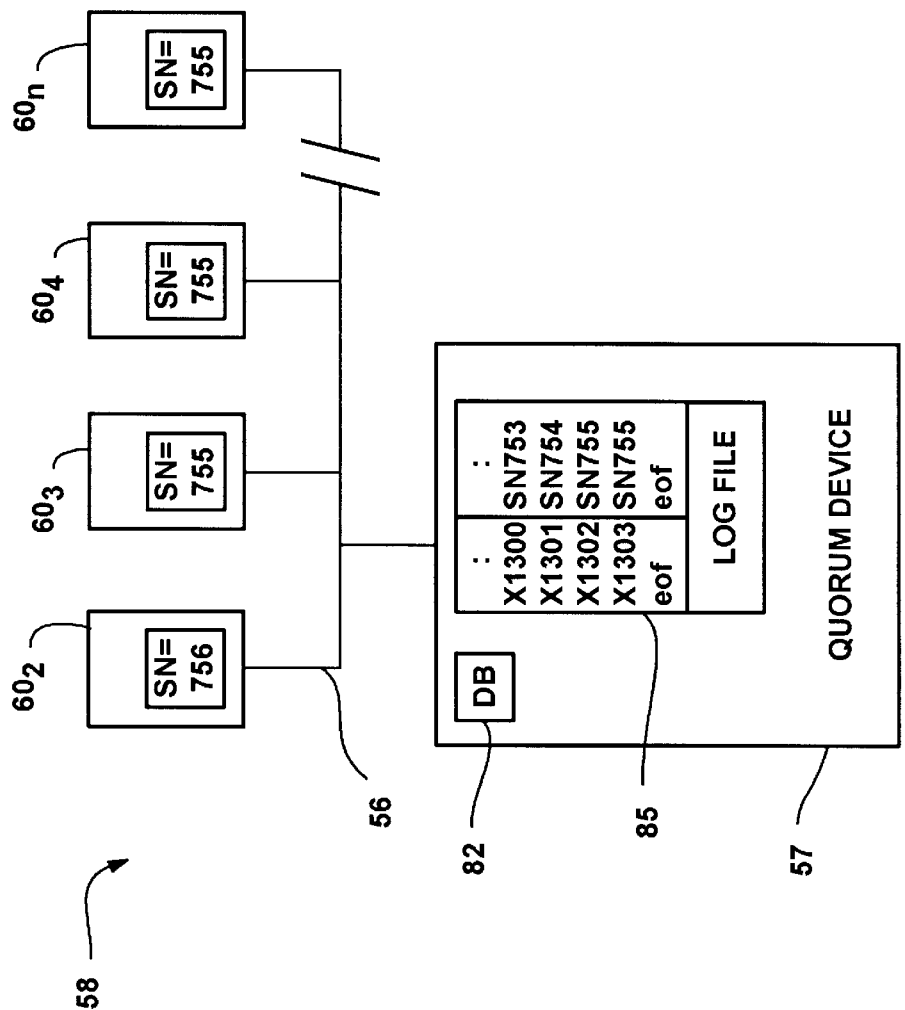

By way of example, FIG. 2A shows a cluster having a log file 85 with transactions stored therein, each transaction having a sequence number associated therewith. In FIGS. 2A–2C, (and in FIG. 9), the transactions are represented by the values X1300–X1304 and the sequence numbers by the values SN753–SN756 (chosen herein arbitrarily as decimal numbers for purposes of readability). As shown in FIG. 2A, the log file 85 has recorded therein transactions up to X1301 associated with a sequence number of SN754, and each of the nodes have incremented their copy of the sequence number to a value of SN=755.

Continuing with the example, later in time, as represented by FIG. 2B, the node $60_1$ has failed after committing the transaction X1302 locally and recording the transaction with its sequence number of SN=755. Because the node $60_1$ failed before it could communicate the transaction to any other node, the other nodes have not incremented their copies of the sequence numbers, which remain at SN=755. Thus, FIG. 2C shows the node $60_1$ having been removed from the cluster. Note that if the node $60_1$ was the locker node, another node takes over locker responsibility. In keeping with the present invention, the next fully replicated transaction (X1303) is also logged with a sequence number of SN755, and the surviving nodes increment their sequence numbers to SN=756. Further transactions are similarly logged.

In accordance with another aspect of the present invention, the log file 85 is unrolled such that transactions therein having the same sequence number as a later transaction are discarded, whereby the cluster remains consistent. To this end, FIG. 10 generally shows the steps taken to unroll the log file 85, using the entries in the exemplary log file 85 of FIG. 9 and the unrolling process 110 associated with the logging manager 84. First, at step 1000, the node $60_6$ that is unrolling the log file 85 locates a previous database checkpoint up to which the local database $61_6$ is known to be consistent with the transactions recorded in the log file 85. For example, the checkpoint may indicate that the log file 85 is consistent until the entry corresponding to the logged transaction X1300, having a sequence number equal to SN753. As can be appreciated, saving a checkpoint while a node is operational eliminates having to unroll the entire log file 85 each time that the unrolling operation is later performed by that node. Next, as also shown in step 1000, the unrolling process reads this logged transaction X1300 in the log file 85, which includes the replicated transaction sequence number SN753.

If this is the last logged transaction in the log file 85, step 1002 detects the end of the file, whereby the unrolling process 110 may simply make the change to the local database $61_6$ based on this logged transaction and then end, since there can be no duplicate transaction recorded thereafter. However, in the present example, this is not the last logged transaction in the log file 85. Accordingly, the process 110 continues to step 1004, which reads the next logged transaction X1301 following the current logged transaction X1300, (e.g., stored at the current logged transaction record plus one additional record), having a sequence number of SN754.

Figure 9:
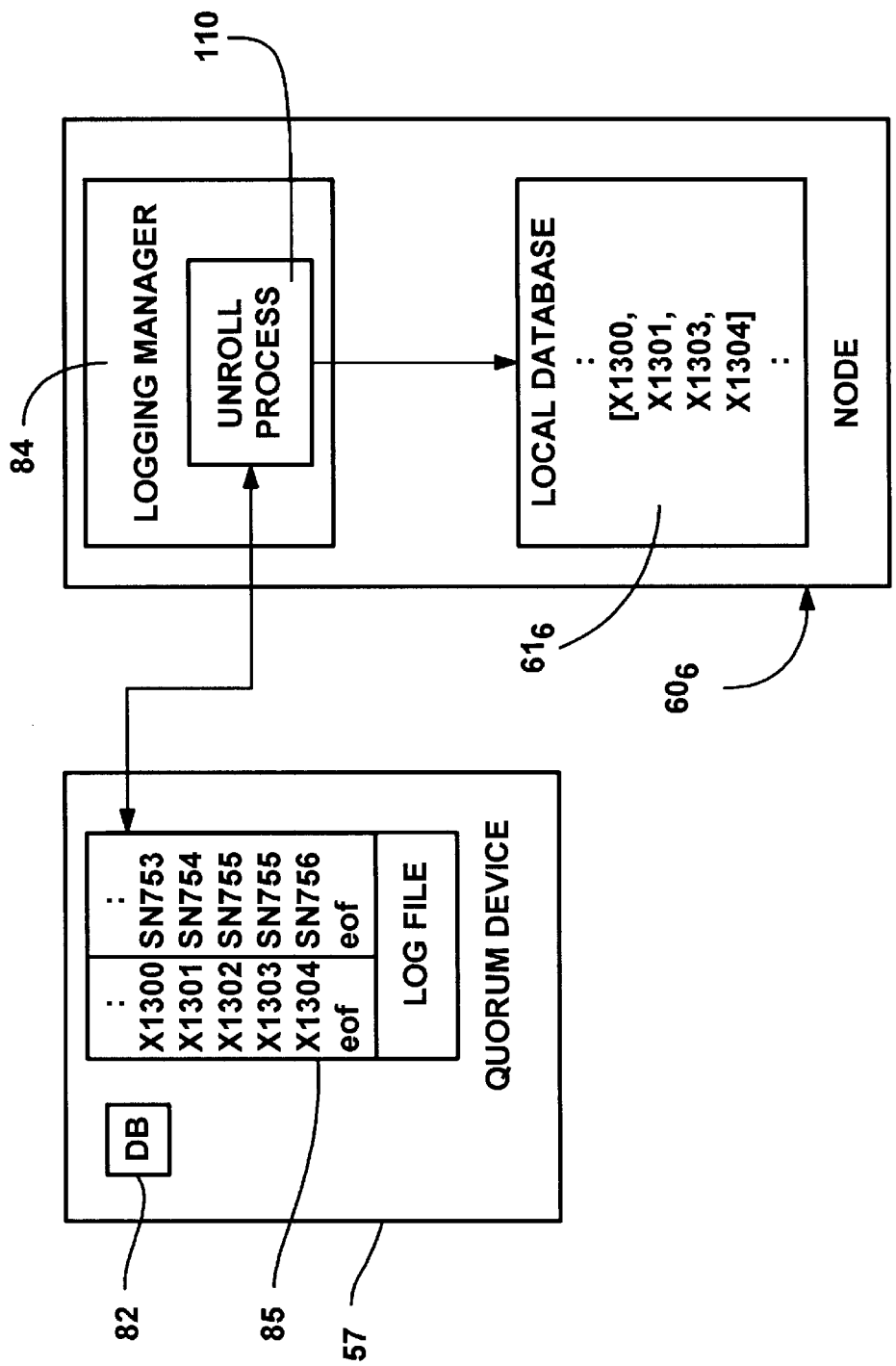
FIG. 9 is a block diagram representing a log file unrolled into a local database.
Figure 10:
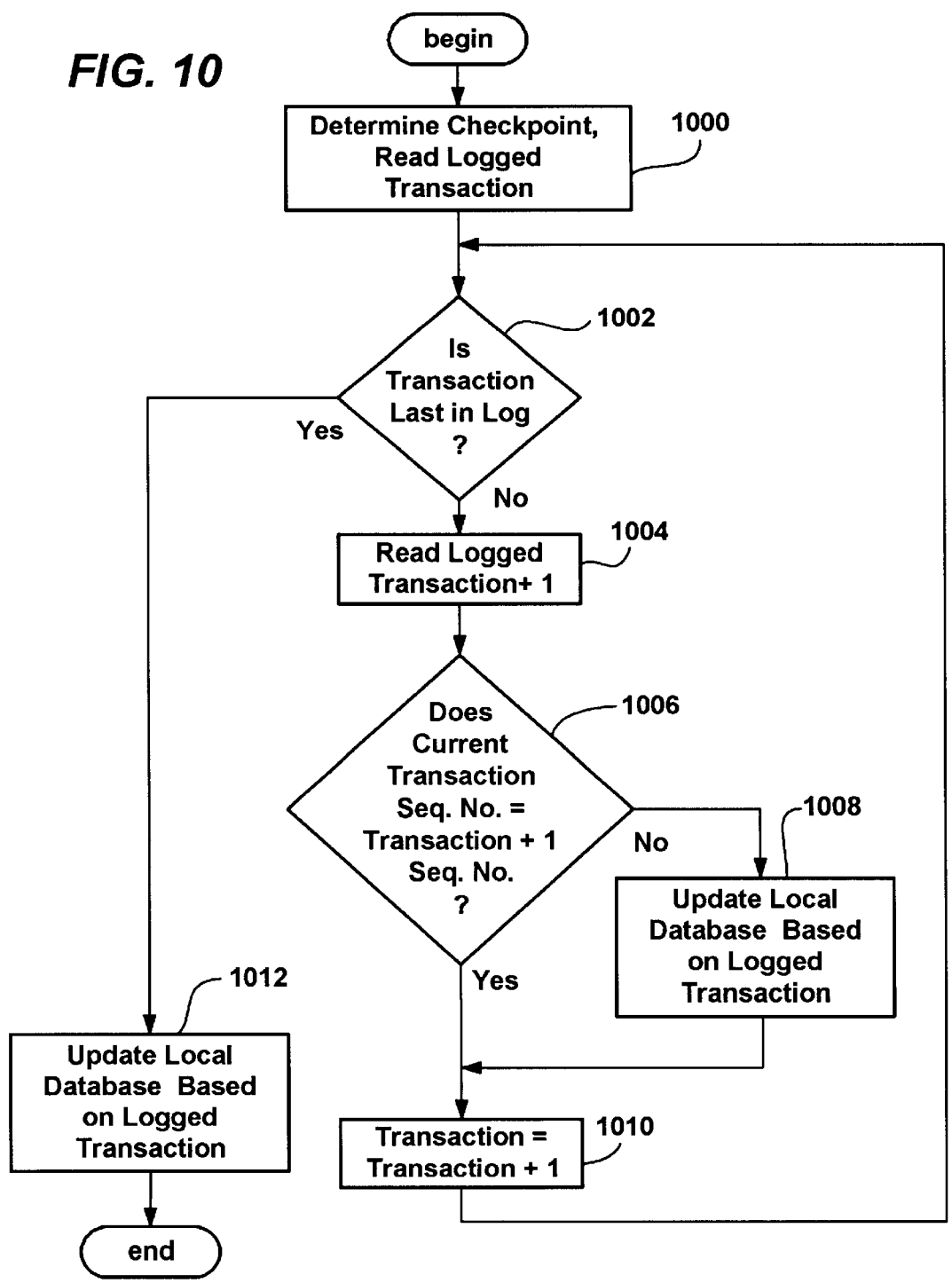
FIG. 10 is a flow diagram generally representing the steps taken to unroll a log file in accordance with one aspect of the present invention.

Step 1006 tests to determine if the sequence number of this subsequent logged transaction X1300 is the same as the sequence number of the current logged transaction. As described above, a duplicate entry would indicate the orphaned replicated transaction failure condition wherein a transaction was committed locally and transaction entered in the log file 85, but the transaction was not replicated to any other cluster node. Thus, if the sequence numbers are not equal, then step 1006 branches to step 1008 wherein the transaction is used to update the local cluster database copy $61_6$. In the present example, since the sequence number SN753 does not equal SN754, the transaction X1300 recorded in the log file 85 is used to update the local database $61_6$. Note that the transaction itself need not be copied, but rather the information committed in the transaction may be suitably extracted for appropriate database storage, as indicated in FIG. 9 by the brackets around the transaction identifiers shown within the database $61_6$. In any event, the process 110 then continues to step 1010 where the pointer to the current logged transaction is adjusted to point to the next logged transaction, (X1301, SN754) and the process repeated from step 1002.

As can be appreciated by repeating the above steps, the logged transaction X1301 has a unique sequence number (SN754) in the log file 85, and thus the process will use the X1301 transaction to update the local database $61_6$. However, the next time through the process, the X1302 logged transaction has a sequence number SN755 that is not unique.

More particularly, when the X1302, SN755 logged transaction is the current logged transaction, the next logged transaction (current plus one) of X1303 has the same sequence number of SN755. In keeping with the invention, step 1006 detects this sequence number equivalence and bypasses the database updating performed by step 1008, since using the current logged transaction X1302 to update the local database $61_6$ would make the local copy inconsistent with the last state of the non-failing nodes of the previous cluster. As can be appreciated, failing to use the transaction X1302 to update the database $61_6$ effectively discards the inconsistent transaction.

The process thus continues to step 1010 to advance the pointer to the next logged transaction, X1303, and returns to step 1002 to test if the X1303 logged transaction is the last in the log file 85. In the present example, one more logged transaction, X1304, SN756 exists in the log file 85, and thus step 1002 branches to step 1004 to read this next logged transaction X1304. Since at step 1006, the sequence number SN755 of the current logged transaction X1303 does not equal this next logged transaction's (X1304) sequence number SN756, the X1303 transaction is used to update the local database at step 1008.

Via step 1010 the current logged transaction becomes X1304, the last transaction logged in the log file 85. Since this logged transaction is the last in the log at step 1002, the unrolling process branches to step 1012 wherein this transaction is used to update the local database $61_6$, and after which the process 110 ends. Note that even if this last transaction was not fully replicated, the cluster state information in the log file 85 is consistent with the cluster state, since no later transactions occurred before the cluster shut down.

Further, it should be noted that if a node fails just after it replicates a transaction to another node, then that other node takes over responsibility for replicating the transaction to any other nodes. As a result, such a transaction is valid and is consistent with the state of the cluster, and is properly logged. In the event that the node which took over the replication also causes the identical transaction to be recorded in the log file 85, no unrolling problem will occur, since only the last of these identical transactions will be used (and in any event, the transactions are identical and therefore consistent). In the event that the node which took over the replication from a failed node also fails before it can replicate the transaction, any remaining nodes' sequence numbers will not be incremented. As a result, even if the second-failed node logged the transaction, if any surviving node logs a subsequent transaction, the previous logged but orphaned replicated transactions will be orphaned replicated transactions having the same sequence numbers and will be properly discarded when unrolled. Note that in keeping with the invention, since no surviving member of the cluster is aware of the change related to that log entry, modifications related to that log entry are thrown away when the cluster is formed again at a later time.

Thus, it should be also noted that it is possible for more than two duplicate sequence numbers to exist in the log file 85. For example, the locker node might fail after it has logged a transaction but before it could replicate the transaction, leading to a first potential occurrence of a duplicate sequence number. A new locker node might take over, and, if the new locker node similarly fails, then the same sequence number will again be logged, i.e, three transaction records having the same sequence number will appear in the log file 85. Regardless of how many times this occurs and how many multiples of the same sequence number are logged, however, only the last of these commonly-sequence-numbered records is used when unrolling, thereby ensuring consistency.

As can be seen from the foregoing detailed description, there is provided an improved method and system for discarding change information in a server cluster that is locally committed, logged, but not replicated to other nodes. The method and system ensure that when unrolling a log file to make a new cluster consistent with a previous cluster, such as across a partition in time, such orphaned replicated transactions are discarded, (unless it was a cluster's last-logged transaction), whereby the new cluster becomes consistent with the actual state of the previous cluster.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a cluster of nodes, a method of recording and retrieving cluster modification data, comprising, associating a sequence number with each set of cluster modification data, recording each set of modification data in association with the sequence number at a log on a common storage device that is accessible to each node capable of forming a new cluster, adjusting the sequence number at each node each time that modification data is successfully replicated to that node, detecting unsuccessfully replicated sets of modification data by retrieving sets of modification data with the sequence number associated therewith from the log on the common storage device, and for each set of modification data retrieved, if the sequence number associated therewith is unique within the log, updating data of a node with the modification data from the log, and if the sequence number is not unique within the log and thereby indicative of at least one unsuccessful replication, determining which set of modification data associated with that sequence number was recorded later in time, and updating data of the node with the later recorded modification data.

2. The method of claim 1 wherein adjusting the sequence number comprises incrementing the sequence number.

3. The method of claim 1 wherein each set of modification data comprises a transaction.

4. The method of claim 3 wherein two transactions have a duplicate sequence number associated therewith, and wherein determining which set of modification data associated with the sequence number was recorded later in time includes discarding the first of the two transactions.

5. The method of claim 3 wherein determining which set of modification data associated with the sequence number was recorded later in time includes reading a current transaction and a transaction recorded immediately thereafter, determining the sequence numbers associated with each transaction, comparing the sequence numbers with one another, and if the sequence numbers are the same, discarding the current transaction.

6. The method of claim 1 further comprising forming a new cluster.

7. The method of claim 6 wherein a node forming the new cluster retrieves the sets of modification data from the log on the common storage device and updates locally maintained modification data with the modification data from the log.

8. The method of claim 1 wherein recording each set of modification data comprises writing the modification data to the log on the common storage device in a sequential order.

9. The method of claim 1 wherein retrieving the sets of modification data comprises reading the modification data from the log on the common storage device.

10. The method of claim 1 wherein retrieving the sets of modification data comprises determining a starting point up to which the cluster data of a node is consistent with the modification data, and retrieving the modification data based on the starting point.

11. A system for forming a new cluster of nodes having state data that is consistent with the state data of a previous cluster of nodes, comprising:
 a storage device having a log file thereon accessible by at least one of the nodes of the previous cluster and a node forming the new cluster;
 the previous cluster including a plurality of nodes, a mechanism for replicating transactions comprising cluster state data to each of the nodes, a mechanism for recording transactions to the log file, each transaction recorded in conjunction with a sequence number provided by a node associated with that transaction, and each node including a mechanism for adjusting a value of the sequence number in response to a transaction committed thereby; and
 the node forming the new cluster including a process for reading the log file and updating the cluster state data of said node based on the transactions in the log file, the process using one transaction per sequence number by comparing the sequence numbers of the transactions recorded in the log file and detecting and handling a partially committed transaction by discarding any transaction therein that precedes another transaction having the same sequence number.

12. The system of claim 11 wherein the storage device comprises a quorum resource.

13. The system of claim 11 wherein each node of the previous cluster includes a copy of the sequence number, and wherein the mechanism for adjusting the sequence number increments the copy of the sequence number therein.

14. The system of claim 11 wherein the new node includes a database for maintaining the cluster state data.

15. The system of claim 11 wherein the mechanism for replicating transactions includes the global update protocol and wherein at least one of the nodes is a locker node.

16. A method for forming a new cluster of nodes having state data that is consistent with the state data of a previous cluster of nodes, comprising:
 preserving the state data of the previous cluster by:
  recording transactions comprising state data information to a log file in conjunction with a sequence number provided by a node associated with that transaction;
  replicating at least some of the transactions comprising cluster state data to each of the nodes, each node having a transaction replicated thereto committing each transaction and adjusting a local copy of the sequence number; and,
 forming a new cluster at a new node by:
  reading the log file;
  comparing the sequence numbers of the transactions recorded in the log file to detect transactions that were not replicated to each node of the previous cluster;
  discarding any transaction in the log file that precedes another transaction having the same sequence number; and
  updating the cluster state data of the new node based on the transactions that were not discarded.

17. A computer-readable medium having computer-executable instructions for performing the method of claim 1.

18. A computer-readable medium having computer-executable instructions for performing the method of claim 16.

19. A method of forming a new cluster at a node, comprising, accessing sequence numbers associated with sets of state data logged by at least one other node of a previous cluster, selecting at least two of the sequence numbers, evaluating the sequence numbers selected to determine whether any of the sequence numbers are similar, and if so, taking action with respect to at least one set of state data associated with the similar numbers to ensure that the new cluster state is consistent with the previous cluster state.

20. The method of claim 19 wherein taking action includes discarding at least one set of state data preceding a set of state data associated with the similar numbers, and using non-discarded state data.

21. The method of claim 19 wherein selecting at least two of the sequence numbers includes maintaining a checkpoint, and looking for identical sequence numbers based on the checkpoint.

22. The system of claim 21 further comprising a checkpoint maintained by the node forming the later cluster, wherein the node forming the later cluster detects information by examining the sequence numbers in the log based on the checkpoint.

23. The system of claim 21 wherein the node forming the later cluster is configured to take action by maintaining the information associated with a last logged sequence numbers of the similar sequence numbers in the log.

24. The system of claim 21 wherein the log is maintained on a quorum resource.

\* \* \* \* \*